United States Patent

Hughes

[15] 3,691,831
[45] Sept. 19, 1972

[54] VARIABLE ORIFICE METER

[72] Inventor: George C. Hughes, Anderson, Ind.

[73] Assignee: Columbia Gas System Service Corporation, Wilmington, Del.

[22] Filed: July 23, 1970

[21] Appl. No.: 57,457

[52] U.S. Cl.................................73/203, 137/601
[51] Int. Cl. ........................G01f 5/00, F17d 1/04
[58] Field of Search........73/199, 201, 202, 203, 207, 73/208, 232–271; 137/110, 599.1, 115, 116.3, 601, 625.3

[56] References Cited

UNITED STATES PATENTS

| | | | |
|---|---|---|---|
| 443,915 | 12/1890 | Goodwin et al. | 73/203 |
| 675,059 | 5/1901 | Flint | 73/203 |
| 353,701 | 12/1886 | Nash | 73/203 |
| 353,702 | 12/1886 | Nash | 73/203 |
| 353,700 | 12/1886 | Nash | 73/203 |
| 476,098 | 5/1892 | Thomson | 73/203 |
| 1,247,330 | 11/1917 | Roberts | 73/203 |

Primary Examiner—Richard C. Queisser
Assistant Examiner—C. E. Snee, III
Attorney—Johnson & Kline

[57] ABSTRACT

Variable orifice meter assembly for determining the total volume of gas flowing through the assembly by measuring only a portion thereof, comprising a positive displacement meter associated with a first stage input regulator and a second stage output regulator. The regulators are directly connected for gas flow therebetween and are also connected to the meter for gas flow from the input regulator through the meter to the output regulator. The output regulator is provided with a valve assembly comprising a secondary valve connected to a main valve, the main valve controlling the direct flow of gas from the input regulator to the output regulator and the secondary valve controlling the flow of gas through the meter. Both valves are mechanically activated for simultaneous unitary operation. The meter is activated by the portion of the total gas flowing therethrough but is calibrated so as to record the total flow of gas through the assembly.

5 Claims, 6 Drawing Figures

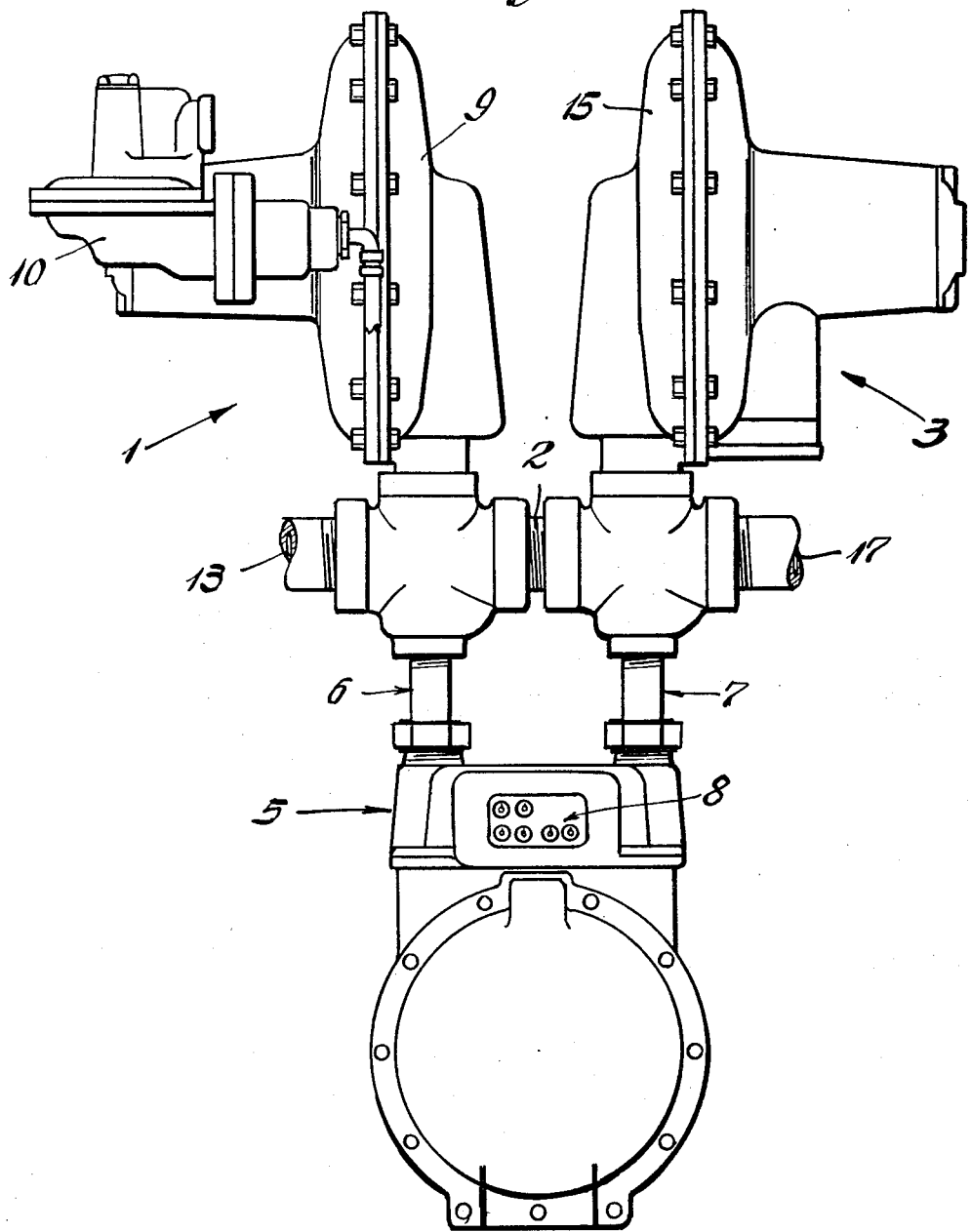

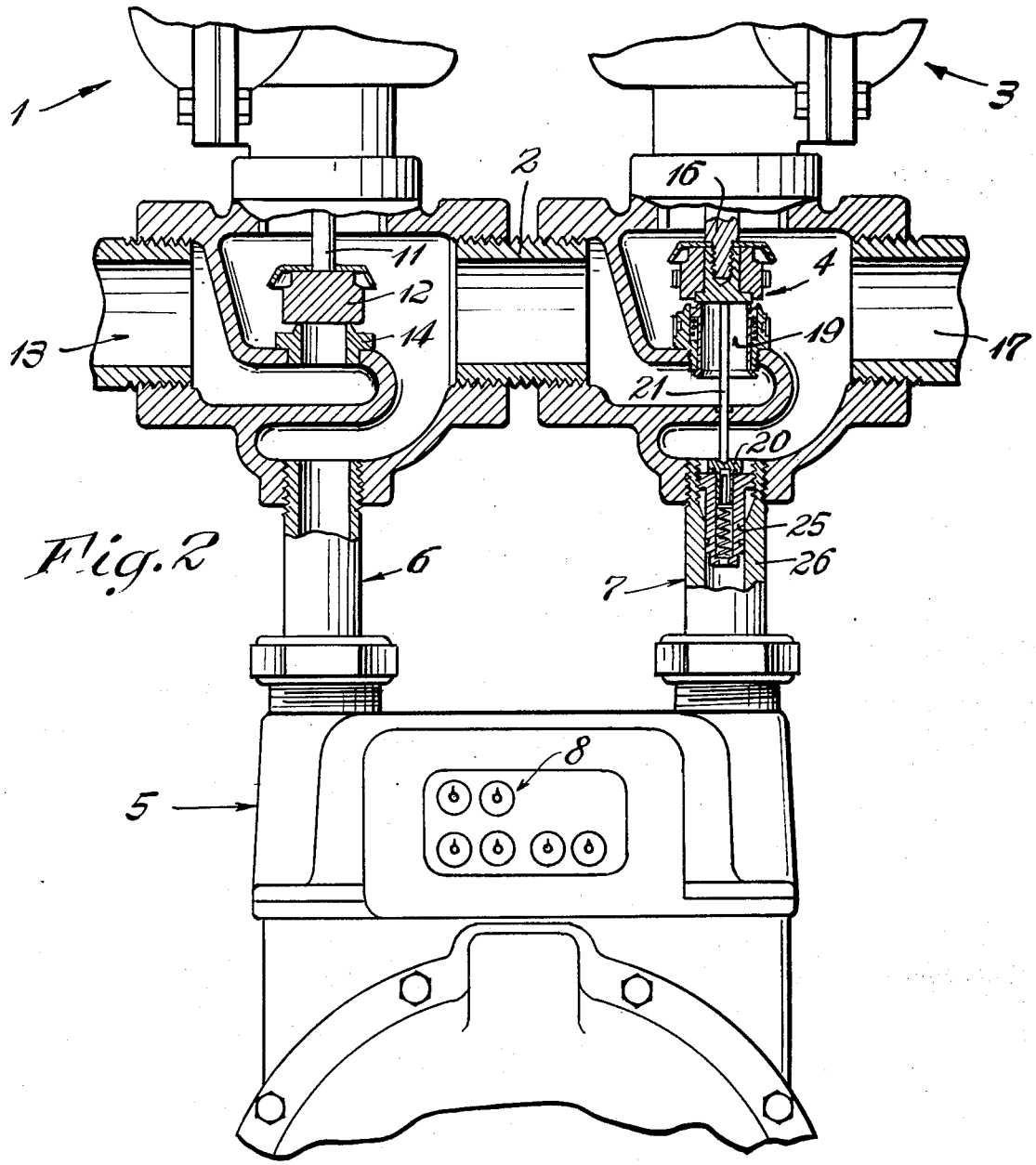

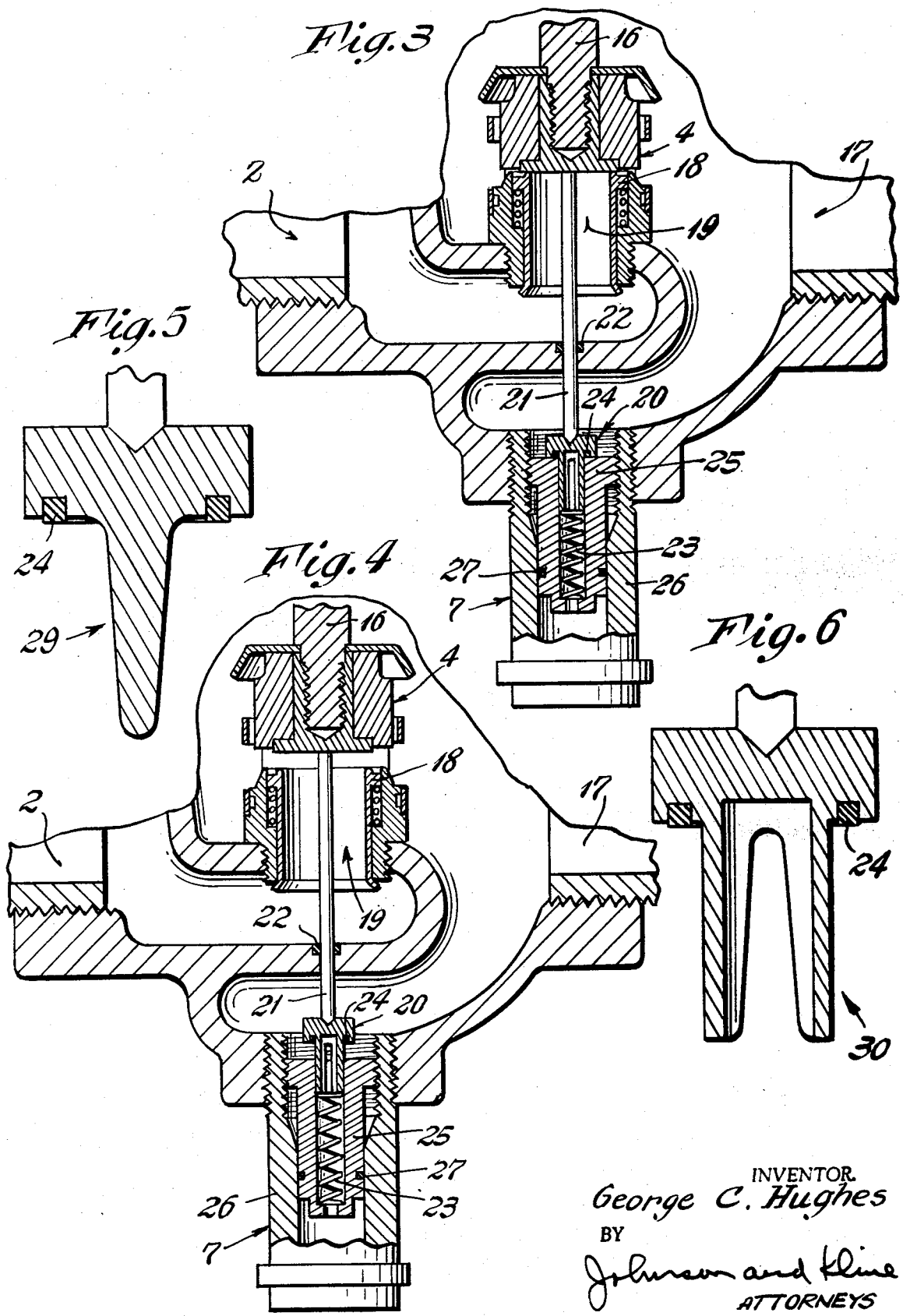

VARIABLE ORIFICE METER

It is known to use orifice meters to measure large flows of gas. The quantity of gas flowing through an orifice varies as the square root of the differential pressure. Because of mechanical and installation limitations, the working range of one orifice plate and one differential gauge is from a maximum capacity down to about one-fourth of maximum capacity. The maximum and minimum capacity may be changed by changing the orifice size but this does not change the ratio therebetween as relates to working capacity.

It is also known to use rotary meters and turbine meters to measure large flows of gas but both of these types are limited in their ability to measure low volumes of gas with accuracy.

The present invention is concerned with a mechanical variable orifice meter assembly adapted for the accurate measurement of the flow of both large and small volumes of gas and having a working range of from zero to maximum orifice capacity. The meter assembly of the present invention comprises a positive displacement meter, a first stage input regulator of the pressure reducing type, a second stage output regulator of the pressure reducing type and a secondary valve connected to the main valve of the output regulator.

The input and output regulators, which may be of the type disclosed in my U.S. Pat. No. 3,488,685, are connected to each other for the direct flow of gas therebetween, controlled by the orifice of the main valve of the output regulator. Both regulators are also connected to the meter for the flow of gas from the input regulator through the meter to the output regulator, controlled by the orifice of the secondary valve of the output regulator. The activation of the output regulator activates the interconnected valves to control the simultaneous flow of the total gas volume in the form of two proportioned volumes. The larger volume bypasses the meter and flows directly through the main valve of the output regulator. The smaller volume passes through the meter, where it is measured, and through the secondary valve. Since the smaller volume represents a known proportion of the total volume, the meter can be calibrated to record the total volume of gas flowing through the system.

In the drawings:

FIG. 1 is a front view of a variable orifice meter assembly according to the present invention;

FIG. 2 is an enlarged sectional view of a portion of the assembly of FIG. 1;

FIG. 3 is a sectional front view of an output regulator of the present meter assembly, illustrating the valves in closed position;

FIG. 4 corresponds to FIG. 3 but illustrates the valves in open position; and

FIGS. 5 and 6 are sectional front views of contoured valves suitable for use in place of the secondary valve shown in FIGS. 2 to 4.

Referring to the drawings, FIG. 1 illustrates a variable orifice meter assembly comprising a first stage pressure reducing inlet regulator 1 of the constant pressure loaded type which delivers an accurate and constant pressure to the main inlet 2 of second stage pressure reducing outlet regulator 3 which delivers a constant outlet pressure regardless of the travel of its main valve 4. The assembly also comprises a meter 5 connected to outlet 6 of the first stage regulator 1 and connected to secondary inlet 7 of the second stage regulator 3. The meter contains a recording index 8 calibrated to read out the total flow of gas through the assembly.

The first stage regulator 1 of FIG. 1 comprises a conventional diaphragm housing 9 and conventional pilot regulator 10. Valve stem 11 is associated with both the bell crank lever of the diaphragm (not shown) and the input regulator valve 12. When the pressure within the assembly is lowered, through the use of gas, the diaphragm and bell crank lever are activated to raise the valve stem 11 and open valve 12 permitting more gas to enter the assembly through first stage inlet 13. Incoming gas passes through valve 12 in open position and enters second stage main inlet 2 and meter inlet 6. When in closed position, as shown in FIG. 2, valve 12 forms a gas-tight seal with the orifice bushing 14.

The second stage regulator of FIG. 2 also comprises a conventional diaphragm housing 15 containing a diaphragm associated with a bell crank lever (not shown) which in turn raises or lowers valve stem 16 and opens or closes connected main valve 4. A reduction in the gas pressure in outlet 17 activates the diaphragm in regulator 3 causing valve stem 16 to raise and open main valve 4 to permit more gas to flow through the assembly.

When in closed position, as shown in FIGS. 2 and 3, the seat of main valve 4 forms a gas-tight seal with the bushing 18 of orifice 19.

Valve 4 is connected to a secondary sliding valve 20 by means of a free pin 21 passing through an O-ring gland seal 22 and abutting valve 20. Pin 21 is held in positive contact with both the main valve 4 and the secondary valve 20 by means of pressure from spring 23 against the base of valve 20.

When in closed position, as shown in FIGS. 2 and 3, the resilient seat 24 of sliding valve 20 forms a gas-tight seal with the orifice body 25 in outlet swivel connection 26. An O-ring 27 provides a gas-tight seal between the orifice body 25 and swivel connection 26.

FIG. 4 shows the valves of the second stage output regulator in open position for the flow of gas though the system. Activation of the diaphragm of output regulator 3 raises the valve stem 16 and opens main valve 4. Simultaneously the secondary valve 20 is urged upward the same distance as the main valve by means of spring 23 and pin 21 which maintains the valves equidistant at all times.

When the valves are in open position, gas is free to flow through the outlet regulator directly from the inlet regulator 1, through main inlet 2 and valve 4, and indirectly from the inlet regulator 1, through the meter 5 and secondary valve 20. As shown in FIG. 4, the secondary sliding valve 20 is provided with a slot constituting the orifice of the secondary valve in open position. However other contoured valves 29 and 30 provided with resilient seats 24, as illustrated by FIGS. 5 and 6, may be used in place of the valve 20 of FIGS. 2 to 4 to provide different linear flow rates.

The meter assembly of the present invention operates on the same orifice principle as known orifice meters in that the quantity of gas flowing through the meter varies as the square root of the differential pressure. The generally accepted orifice formula is $Q_h = C \sqrt{h_P P_o}$ whereas in the modified formula according to the present invention is $Q_h = CA \sqrt{h_P P_o}$, where:

$Q_h$ = Quantity rate of gas flow at base conditions, cu.ft./hr.
$C$ = Orifice flow constant per square inch of area.
$h_P$ = Differential pressure in psi at 60° F.
$P_o$ = Outlet pressure, psi absolute.
$A$ = A factor related to valve travel.

The valve of $\sqrt{h_P P_o}$ is constant as applied to this invention, as is C. The variable factor is A, which is directly proportional to valve travel. Valve travel of the main valve 4 of regulator 3 causes a direct and equal travel of secondary sliding valve 20. The two valves are preferably designed so that the equal travel of the valves to open position permits a much greater volume of gas to pass through valve 4 than through valve 20. The relationship between the volumes of gas passed by each valve can be determined and then the meter can be calibrated so as to extrapolate and record the total gas flow through the assembly by means of the measurement of that known portion of the total gas which passes through the meter.

For example, assuming a ¾ inch orifice 19 sealed by valve 4 and a valve travel of from 0. to 0.186 inch, a flow of 50 cu.ft./hr. results at 0.001 inch travel and 5,000 cu.ft./hr. results at 0.100 inch travel with a fixed 5 psi inlet pressure to the orifice and a 7 inch W.C. outlet pressure. Valve travel of main valve 4 causes a direct and equal travel of valve 20 but the size of the orifice 28 of valve 20 is sufficiently smaller than that of the main valve that a valve travel of 0.001 inch permits only one cu.ft./hr. of gas flow through valve 20 and a valve travel of 0.100 inch permits only 100 cu.ft./hr. of gas flow through valve 20. Thus only one-fiftieth of the total gas flow passes through the meter which can be calibrated to record a flow of X plus 50X for each X cu.ft./hr. of gas passing through the meter.

As will be clear to those skilled in the art in view of the present disclosure, the proportion of the total gas flow which passes through the meter may be varied by varying the size and design of the main valve 4 and/or of the secondary valve 20 whereby a greater or smaller proportion of the total gas flow bypasses the meter.

The unitary mechanical operation of the main and secondary valves of the present invention is highly advantageous for a number of reasons. Unconnected independent valves are subject to independent operation whereby one valve might become defective and travel a greater or smaller distance than the other. This destroys the original flow proportion relationship calculated between the valves and leads to an inaccurate meter reading. Also, if an electrical means is employed to activate either or both of the valves, rather than the present mechanical means, this introduces a severe hazard in cases where the gas being measured is explosive.

As will be clear to those skilled in the art, another pressure reducing regulator can be placed between the outlet of regulator 1 and the inlet of meter 5 if the outlet pressure of regulator 1 is greater than the working pressure of meter 5. Alternatively a combination regulator-meter can be used in such a situation in place of meter 5. Also the use of a temperature corrected meter can provide temperature correction to standard conditions for the total gas flow.

Variations and modifications may be made within the scope of the claims and portions of the improvements may be used without others.

I claim:

1. Variable orifice meter assembly for determining the total volume of gas flowing through the assembly by measuring only a portion thereof, which comprises a positive displacement meter, an input regulator of the pressure reducing type which transmits the total volume of the gas at a constant input pressure and which is connected to said meter, an output regulator of the pressure reducing type which transmits the total volume of gas at a constant outlet pressure, said output regulator having a first connection to said input regulator and a second connection to said meter, and a mechanical valve assembly comprising a main valve and a secondary valve connected to each other for simultaneous unitary operation in opening and closing said connections to said output regulator, the orifices of said valves being in known direct proportion whereby the volume of gas which can flow through said secondary valve is in known direct proportion to the volume of gas which can flow through said main valve, said meter being adapted to measure the volume of gas which flows through the meter whereby the total volume of gas flowing through the assembly can be calculated.

2. Mechanical meter assembly according to claim 5 in which the meter comprises a calibrated index which calculates and records the total volume of gas flowing through the assembly from that proportion of the total volume which passes through the meter.

3. Mechanical meter assembly according to claim 5 in which the orifice of the main valve is substantially larger than the orifice of the secondary valve whereby only a minor proportion of the total gas volume measured by the assembly passes through the meter.

4. Mechanical meter assembly according to claim 5 in which the valve assembly comprises the main valve, the secondary valve, a free pin spacing the two valve and spring means adjacent the secondary valve for opening the secondary valve to correspond to the opening of the main valve.

5. Variable orifice meter assembly for determining the total volume of gas flowing through a main line by measuring only a portion thereof comprising a positive displacement meter, a gas supply feeding gas under a constant pressure to a main line through said assembly, meter inlet means associated with said main line for directing a portion of said gas supply from said main line through said meter, a regulator of the pressure reducing type connected to said main line including a main valve for controlling the flow of gas through said main line at a constant pressure, a mechanical valve assembly activated by said regulator and comprising said main valve and a secondary valve for controlling the flow of gas through said meter, said valves being connected to each other for simultaneous unitary operation in response to the operation of said regulator, the orifices of said valves being in known direct proportion whereby the volume of gas which can flow through said secondary valve is in known direct proportion to the volume of gas which can flow through said main valve, said meter being adapted to measure the volume of gas which flows through the meter whereby the total volume of gas flowing through the assembly can be calculated.

* * * * *